(12) United States Patent
Furukawa et al.

(10) Patent No.: US 9,075,440 B2
(45) Date of Patent: Jul. 7, 2015

(54) OPERATION INPUT DEVICE AND OPERATION INPUT DETECTING DEVICE

(75) Inventors: Kenichi Furukawa, Tokyo (JP); Shigenori Inamoto, Tokyo (JP); Yuki Takahashi, Tokyo (JP); Yasutaka Kitamura, Tokyo (JP); Masaharu Kagami, Tokyo (JP); Kensuke Yamada, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 45 days.

(21) Appl. No.: 14/113,246

(22) PCT Filed: Apr. 26, 2012

(86) PCT No.: PCT/JP2012/061249
§ 371 (c)(1),
(2), (4) Date: Oct. 22, 2013

(87) PCT Pub. No.: WO2012/147866
PCT Pub. Date: Nov. 1, 2012

(65) Prior Publication Data
US 2014/0049514 A1      Feb. 20, 2014

(30) Foreign Application Priority Data

Apr. 27, 2011   (JP) ................ 2011-100197

(51) Int. Cl.
*G06F 3/01*   (2006.01)
*G01B 7/00*   (2006.01)
*G01D 5/20*   (2006.01)

(52) U.S. Cl.
CPC .............. *G06F 3/016* (2013.01); *G01B 7/003* (2013.01); *G01D 5/2013* (2013.01)

(58) Field of Classification Search
CPC ........ G06F 3/016; G01B 7/003; G01D 5/2013
USPC .................................. 345/156–178
See application file for complete search history.

(56) References Cited

U.S. PATENT DOCUMENTS

| 5,434,566 A | 7/1995 | Iwasa et al. | |
| 2004/0056745 A1* | 3/2004 | Watanabe et al. | ............. 335/220 |

(Continued)

FOREIGN PATENT DOCUMENTS

| JP | H01-199101 | 8/1989 |
| JP | H03-013802 | 1/1991 |

(Continued)

OTHER PUBLICATIONS

International Search Report mailed on Jun. 19, 2012.

(Continued)

*Primary Examiner* — Premal Patel
(74) *Attorney, Agent, or Firm* — IPUSA, PLLC

(57) ABSTRACT

An operation input device includes a coil, an operation part configured to be displaced in an axial direction of the coil by the action of an operation input, a core whose positional relationship with the coil is changed by the displacement of the operation part, a yoke placed outside the coil, and a magnet configured to generate a magnetic flux that flows through the core and the yoke. The coil is configured to output a signal corresponding to the amount of the displacement of the operation part. The operation part is caused to move by an electric current flowing through the coil and the magnetic flux of the magnet.

18 Claims, 15 Drawing Sheets

(56) References Cited

U.S. PATENT DOCUMENTS

2004/0059245 A1* 3/2004 Watanabe et al. ............ 600/552
2007/0102270 A1 5/2007 Takashima et al.

FOREIGN PATENT DOCUMENTS

| JP | 04-362722 | 12/1992 |
|---|---|---|
| JP | 09-222301 | 8/1997 |
| JP | 09-231008 | 9/1997 |
| JP | 10-055251 | 2/1998 |
| JP | 2003-173725 | 6/2003 |
| JP | 2005-275632 | 10/2005 |
| JP | 2007-087274 | 4/2007 |
| JP | 2007-129678 | 5/2007 |
| JP | 2009-123245 | 6/2009 |

OTHER PUBLICATIONS

Japanese Office Action mailed Mar. 10, 2015.

* cited by examiner

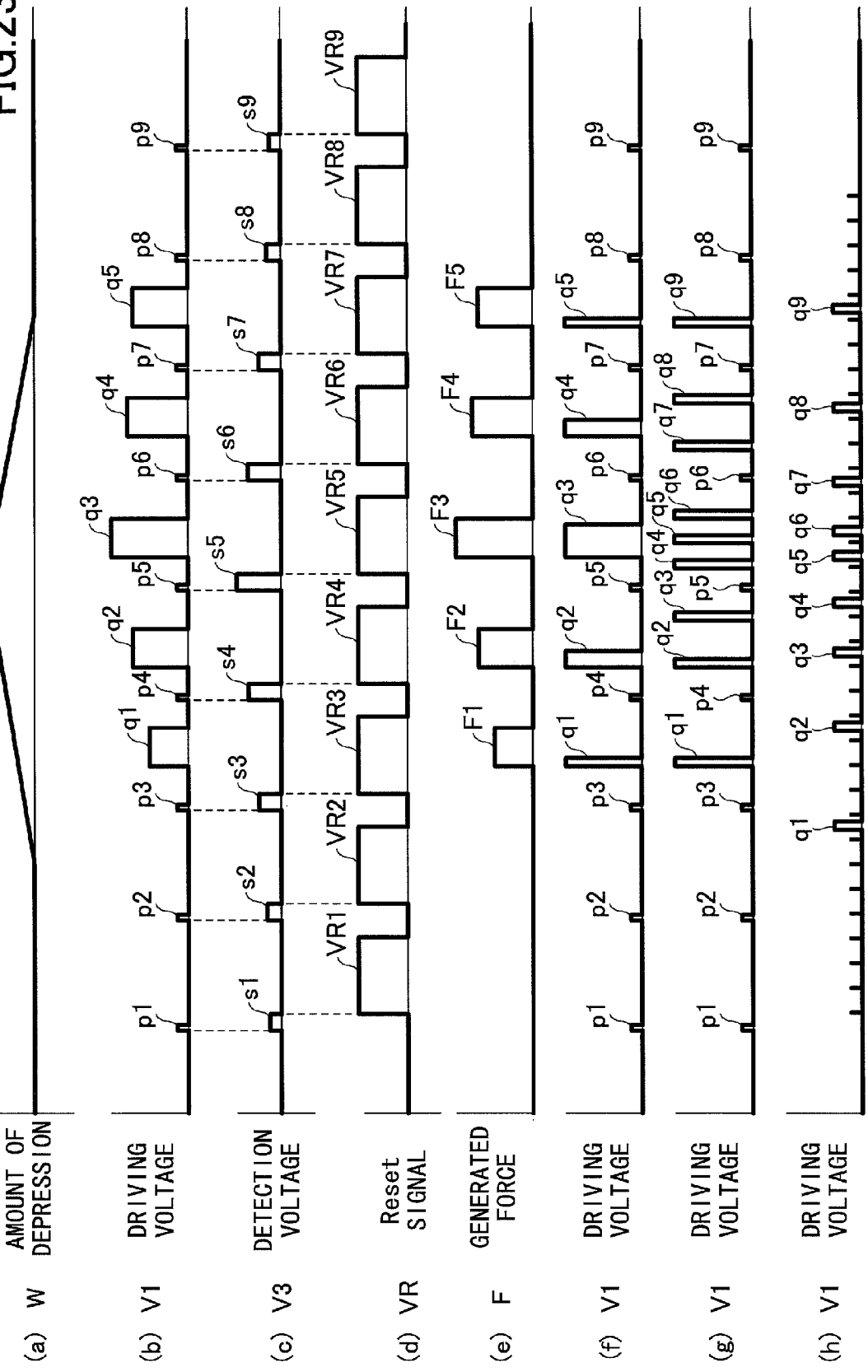

OPERATION INPUT DEVICE AND OPERATION INPUT DETECTING DEVICE

TECHNICAL FIELD

The present invention relates to an operation input device and an operation input detecting device that include an operation part on which an operation input acts, and more particularly to those capable of vibrating the operation part.

BACKGROUND ART

A conventional input device has been known that detects the input position and pressing force of a user's finger at the time of pressing using a resistive touchscreen panel, and that also vibrates the touchscreen panel. (See, for example, Patent Document 1.) While detecting the input position and the pressing force with a voltage measurement circuit, this input device applies vibrations to a user with a vibration motor.

PRIOR ART DOCUMENT

Patent Document

[Patent Document 1] Japanese Laid-Open Patent Application No. 2005-275632

SUMMARY OF THE INVENTION

Problems to be Solved by the Invention

According to the above-described conventional technique, however, the function of detecting an operation input that acts on the operation part and the function of vibrating the operation part are implemented by separate independent configurations. Therefore, the input device is likely to become large in size. Furthermore, the configuration for implementing the function of applying vibrations is complicated.

Therefore, the present invention has an object of providing an operation input device and an operation input detecting device capable of implementing, with a simple configuration, the function of detecting an operation input that acts on an operation part and the function of vibrating the operation part.

Means for Solving the Problems

In order to achieve the above-described object, an operation input device according to the present invention includes a coil, an operation part configured to be displaced in an axial direction of the coil by an action of an operation input, a core whose positional relationship with the coil is changed by a displacement of the operation part, a yoke placed outside the coil, and a magnet configured to generate a magnetic flux that flows through the core and the yoke, wherein the coil is configured to output a signal corresponding to an amount of the displacement of the operation part, and the operation part is caused to move by an electric current flowing through the coil and the magnetic flux of the magnet.

Furthermore, in order to achieve the above-described object, an operation input device according to the present invention includes a coil, an operation part configured to be displaced in an axial direction of the coil by an action of an operation input, a core and a yoke, wherein a positional relationship of the core and the yoke with the coil is changed by a displacement of the operation part, and a magnet placed between the core and the yoke, wherein the coil is configured to output a signal corresponding to an amount of the displacement of the operation part, and the operation part is caused to move by an electric current flowing through the coil and a magnetic flux of the magnet.

Furthermore, in order to achieve the above-described object, an operation input detecting device according to the present invention includes an operation input device according to the present invention, a detection part configured to detect a change in inductance of the coil, and a control part configured to cause the operation part to move by causing an electric current to flow through the coil.

Effects of the Invention

According to the present invention, it is possible to implement the function of detecting an operation input that acts on an operation part and the function of vibrating the operation part with a simple configuration.

BRIEF DESCRIPTION OF THE DRAWINGS

FIG. 23 is a waveform chart at the time of putting an operation input device into operation.

DESCRIPTION OF EMBODIMENTS

A description is given below, with reference to the drawings, of embodiments of the present invention. An operation input device, which is an embodiment of the present invention, is an operation interface that receives a force due to a hand or finger of an operator and outputs an output signal that varies in accordance with the received force. An operation input of the operator is detected based on the output signal. By detecting the operation input, it is possible to cause a computer to determine the contents of an operation corresponding to the detected operation input.

For example, in electronic apparatuses such as remote controllers for operating game apparatuses, television sets, etc., portable terminals such as cellular phones and music players, personal computers and electrical products, it is possible to cause an object (for example, an indicator such as a cursor or a pointer, or a character) displayed on the screen of a display provided in such electronic apparatuses to move in accordance with the contents of an operation intended by an operator. Furthermore, by the operator providing a predetermined operation input, it is possible to cause a desired function of an electronic apparatus corresponding to the operation input to be exerted.

On the other hand, usually, with respect to an inductance L of an inductor such as a coil (winding), the relational expression $L=K\mu n^2 S/d$ holds, where K is a coefficient, $\mu$ is a magnetic permeability, n is the number of turns of a coil, S is the cross-sectional area of a coil, and d is the magnetic path length of a coil. As is clear from this relational expression, when parameters dependent on a shape, such as the number of turns and the cross-sectional area of a coil, are fixed, the inductance changes by changing at least one of the surrounding magnetic permeability and the magnetic path length.

A description is given below of embodiments of an operation input device and an operation input detecting device that use this change in inductance. This operation input device receives an operator's force input from the direction of positive Z coordinates in a Cartesian coordinate system defined by the X axis, the Y axis, and the Z axis. The operation input device includes a displaceable member, whose positional relationship with a coil changes due to the action of an operation input to change the inductance of a coil. The operation input detecting device may detect the operation input by detecting the movement of the displaceable member displaced by the operation input of an operator based on a predetermined signal that varies in accordance with the magnitude of the inductance.

Furthermore, the operation input detecting device causes an electric current that generates a magnetic field around a coil to flow through the coil. By the magnetic field thus generated, movements that stimulate the operator are generated in an operation part on which the operator's force may act.

Figure 1:
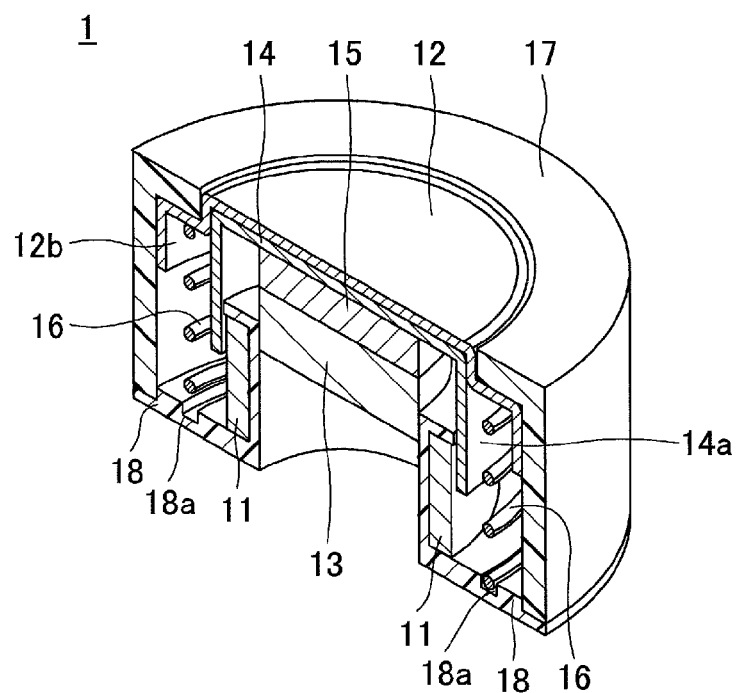
FIG. 1 is a perspective cross-sectional view of an operation input device 1, which is a first embodiment of the present invention.
Figure 2:
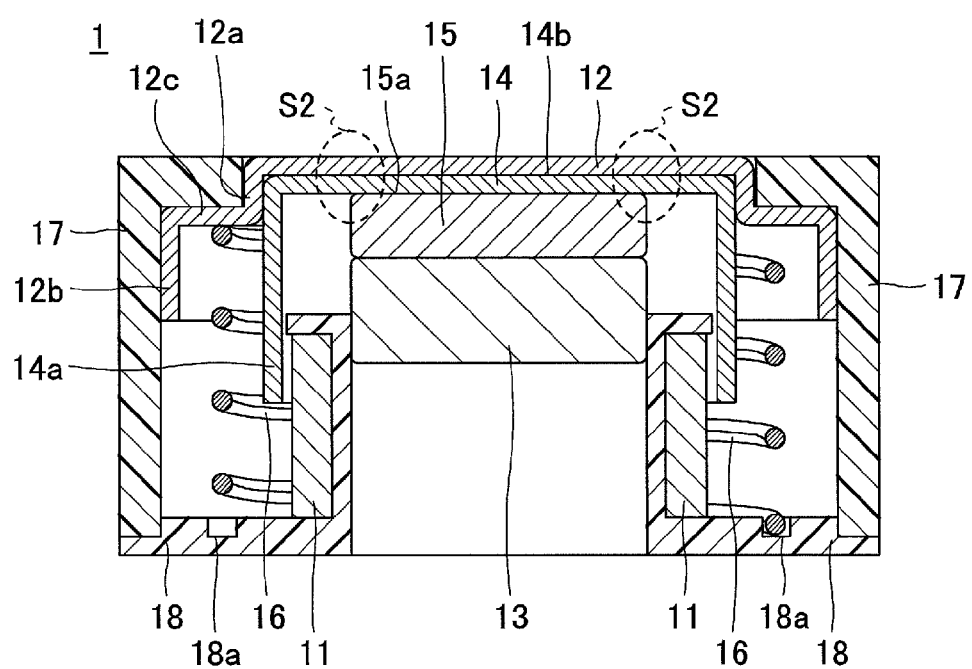
FIG. 2 is a front cross-sectional view of the operation input device 1.

FIG. 1 is a perspective cross-sectional view of an operation input device 1, which is a first embodiment of the present invention. FIG. 2 is a cross-sectional view of the operation input device 1. FIGS. 1 and 2 illustrate an unoperated state where no operation input is exerted on an operation part 12. The structure of the operation input device 1 is symmetrical with respect to the graphically illustrated cross section. Accordingly, its general view is omitted. The same is the case with other operation input devices described below.

The operation input device 1 includes a coil 11, the operation part 12, a core 13, a yoke 14, and a magnet 15. The coil 11 is formed by winding a wire (lead wire) into a tubular shape. The operation part 12 is a part that is displaced in the axial directions (vertical directions in the case of the drawings) of the coil 11 by the action of an operation input. The core 13 is a magnetic body whose positional relationship with the coil 11 changes because of the displacement of the operation part 13. The yoke 14 is a magnetic body placed outside the coil 11. The magnet 15 is a source of a magnetic flux that flows through the core 13 and the yoke 14.

When the positional relationship between the coil 11 and the core 13 changes because of the displacement of the operation part 12, the magnetic permeability around the coil 11 changes, so that the self-inductance of the coil 11 changes. The coil 11 outputs a signal waveform corresponding to the amount of the displacement of the operation part 12 in accordance with the change in inductance. Accordingly, by detecting the signal waveform, it is possible to calculate the amount of the displacement (the amount of the operation) of the operation part 12.

Furthermore, when an electric current is caused to flow through the coil 11, a force acts on the core 13 because of a magnetic flux generated in accordance with the electric current flowing through the coil 11 and a magnetic flux generated from the magnet 15. Therefore, it is possible to move the operation part 12, which is displaced in accordance with a force that acts on the core 13.

Accordingly, according to the operation input device 1 having this configuration, solely by causing an electric current to flow through the coil 11 that makes it possible to detect the amount of the displacement of the operation part 12, it is possible to apply one or more reciprocating vibrations to the operation part 12. Therefore, it is possible to implement the function of detecting an operation input that acts on the operation part 12 and the function of applying vibrations to the operation part 12 with a simple configuration.

Next, a description is given in further detail of a configuration of an operation input device.

The coil 11 is a cylindrically wound wire (lead wire) fixed to a base part. The coil 11 has a cylindrical shape, but may alternatively have other tubular shapes such as a polygonal tube shape. By way of example, FIGS. 1 and 2 illustrate a configuration where the coil 11 is wound around the exterior side surface of a cylindrical part of a bobbin 18. The coil 11 is positioned between a side surface part of the columnar core 13 and a side surface part 14a of the cylindrical yoke 14.

The operation part 12 has its displacement, from an opening part of a case 17 toward the inside of the case 17, successively change in accordance with the amount of input of an operation input that acts on an operation surface on the upper side of the operation part 12. The operation part 12 is a displaceable member that increases the inductance of the coil 11 by being displaced downward in an upper space on the axial extension of the coil 11 by an operation input that directly or indirectly acts on the operation surface. The operation part 12, which is provided on the side on which an operation input is made relative to the coil 11, includes a lower surface that faces toward an upper end surface 11a of the coil 11 and an upper surface on which an operator's force directly or indirectly acts.

The core 13 is a displaceable member that changes the inductance of the coil 11 by being displaced in the axial directions of the coil 11 in a hollow part of the coil 11 by the action of an operation input. The core 13 is preferably a columnar magnetic body when the coil 11 is cylindrical and is preferably a magnetic body of a prism shape when the coil 11 has a polygonal tube shape.

The yoke 14 is provided on the side of the upper end surface 11a of the coil 11 and its positional relationship with the coil 11 is changed by the displacement of the operation part 12. The yoke 14 may be of any material having a relative magnetic permeability of 1 or more. For example, the relative magnetic permeability is preferably more than or equal to 1.001. Specifically, a steel sheet (having a relative magnetic permeability of 5000) or the like is preferable.

The magnet 15 is placed between the core 13 and the yoke 14 and generates a magnetic flux that penetrates through a cross section of the core 13 and a cross section of the yoke 14. The magnet 15 is formed into a columnar shape that is substantially equal in outside diameter to the core 13.

Figure 3:
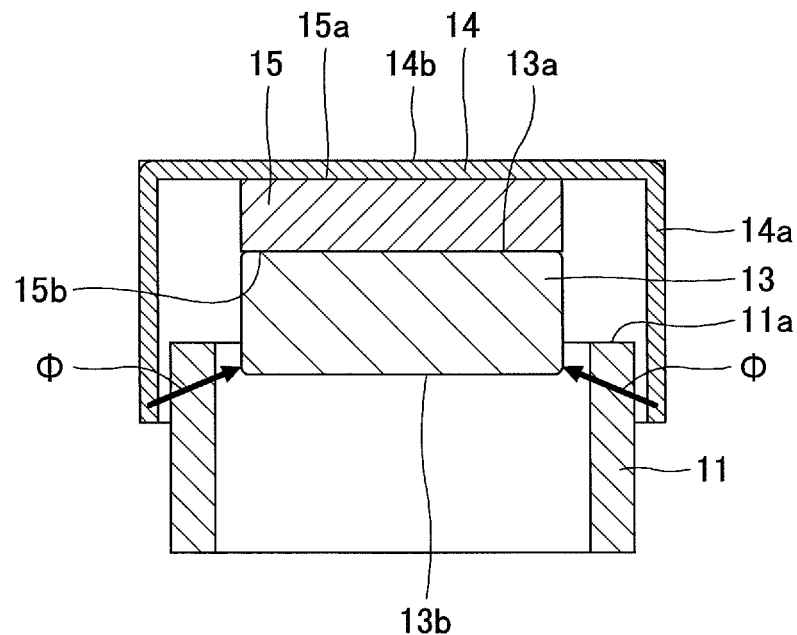
FIG. 3 is a cross-section view of an initial position state where no operation input is applied.
Figure 4:
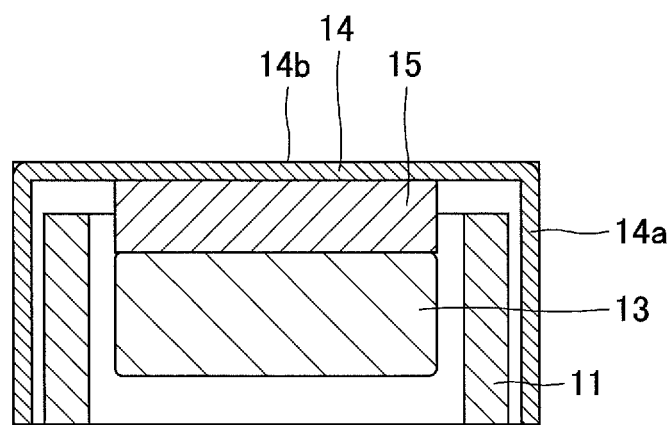
FIG. 4 is a cross-sectional view of a depressed position state where an operation input is applied.

In the operation input device 1, a magnetic circuit is formed that includes the yoke 14, the magnet 15, which makes the same movement as the displacement of the yoke 14, and the core 13, which is a soft magnetic body. The magnet 15 generates a magnetic flux in this magnetic circuit. As illustrated in FIG. 3, the yoke 14, the magnet 15, the core 13, and the coil 11 are disposed so that a magnetic flux Φ generated in an air gap in the magnetic circuit is perpendicular to the axial directions of the coil 11. The core 13 is displaced, together with the yoke 14 and the magnet 15, by the displacement of the operation part 12 due to the action of an operation input. As illustrated in FIG. 4, when the core 13 is displaced in a direction to approach the coil 11, the magnetic permeability around the coil 11 increases, so that the self-inductance of the coil 11 increases. By detecting the value of the inductance, it is possible to detect the amount of the displacement of the operation part 12. Furthermore, it is possible to apply a forcible feedback force to the operator via the operation part 12 through a force exerted on the core 13 by an electric current applied to the coil 11 and the magnetic flux of the magnet 15. At this point, the direction of the force exerted on the core 13 is switched by switching the direction of the electric current flowing through the coil 11. Therefore, it is possible to apply a force in the direction equal or opposite to the direction of the operation of the operation part 12 to the operator via the operation part 12.

Figure 5:
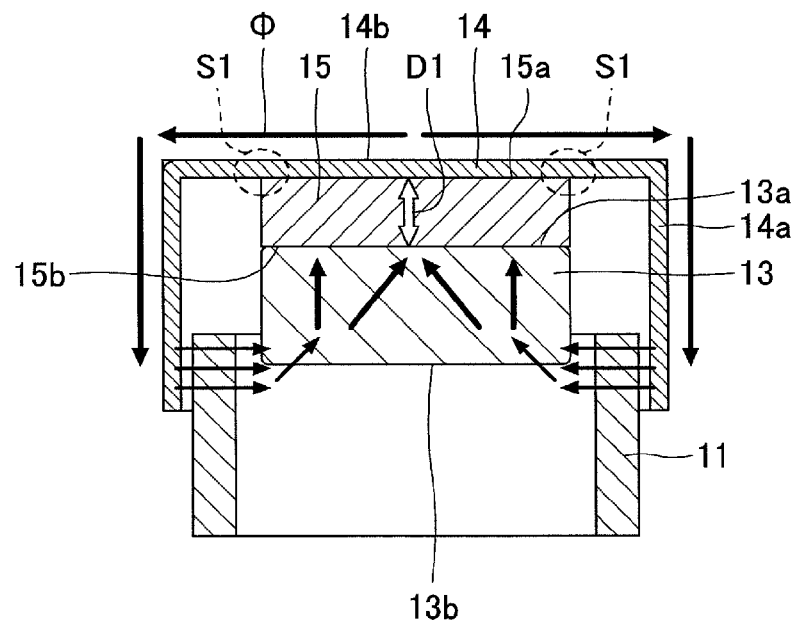
FIG. 5 is a diagram illustrating a magnetic circuit.

FIG. 5 is a diagram illustrating a magnetic circuit. The magnet 15 has an outside diameter smaller than the inside diameter of the coil 11, and is magnetized in the directions of its end surfaces in magnetization directions D1, which are substantially equal to the operating directions of the operation part 12. The core 13 is provided on a lower surface 15b of the magnet 15, and has an outside diameter smaller than the inside diameter of the coil 11. The yoke 14 is provided on an upper surface 15a of the magnet 15 and has a cup shape, where a cylindrical part having an inside diameter larger than the outside diameter of the coil 11 is formed. According to the operation input device 1, the magnet 15, the core 13, and the yoke 14 are equally displaced downward by an operation input that acts on the operation part 12. The magnet 15 and the core 13 move in an axial direction of the coil 11 in the space inside the coil 11, and the side surface part 14a of the cylindrical yoke 14 moves along the exterior side surface of the coil 11 in the space outside the coil 11.

As illustrated in FIG. 5, part of the coil 11 is placed over (overlaps) the core 13 and the side surface part 14a of the yoke 14 in the unoperated state where the operation part 12 is not operated (in the initial position state of the operation part 12). The overlapping arrangement like this makes it possible to generate a force due to the excitation of the coil 11 from the unoperated state. In the case of FIG. 5, part of the core 13 and part of the yoke 14 are over part of the coil 11. A lower surface 13b of the core 13 and a lower end of the side surface part 14a of the yoke 14 are positioned lower than the upper end surface 11a of the coil 11.

Furthermore, when the core 13 and the yoke 14 have respective parts positioned outside the axial end surface of the coil 11 in the unoperated state, it is possible to increase the amount of stroke by which the operation part 12 may change the inductance, so that it is possible to increase a change in the inductance relative to the amount of the operation of the operation part 12 so as to improve detection sensitivity. In the case of FIG. 5, an upper surface 13a of the core 13 and part of the side surface part 14a of the yoke 14 are positioned higher than the upper end surface 11a of the coil 11. That is, the core 13 and the yoke 14 have respective parts that are positioned higher than the upper axial end surface of the coil 11 in the unoperated state.

The yoke 14 is fixed to the upper surface 15a of the magnet 15, and the operation part 12 is in surface contact with and fixed to an upper surface 14b of the yoke 14. The magnetic flux from the magnet 15 concentrates in regions S1 and S2 illustrated in FIGS. 2 and 5. When the operation part 12 is of a yoke material (magnetic material) like the yoke 14, the cross-sectional area of the yoke through which the magnetic flux passes increases as illustrated in the regions S2, so that it is possible to moderate a leakage phenomenon due to the magnetic flux saturation of the yoke 14.

As illustrated in FIG. 2, the operation part 12 has a stepped cup shape where multiple cylindrical parts are formed. In the case of FIG. 2, two cylindrical parts, an inner cylindrical part and an outer cylindrical part, in the operation part 12. A side surface part 12a of the inner cylindrical part of the operation part 12 fits into an upper surface opening part of the case 17 of the operation input device 1, and a side surface part 12b of the outer cylindrical part of the operation part 12 fits with an interior side surface of the cylindrical case 17. The side surface part 12b of the outer cylindrical part slidably fits with the interior side surface of the case 17, so that it is possible to stably guide the operation part 12 in the axial directions of the coil 11. The case 17 is a housing that accommodates the operation part 12.

A return spring 16 is a support member that elastically supports the operation part 12 so that the operation part 12 is displaceable in a direction to approach the coil 11. The return spring 16 is a coil spring that constantly provides the operation part 12 with a force in a direction in which the operation part 12 moves away from the coil 11. The return spring 16 is attached inside the case 17 with the outer cylindrical part of the operation part 12 being in contact with the inside of an upper surface of the case 17.

The return spring 16 is provided in a cylindrical annular space defined by the side surface part 14a of the yoke 14 and the side surface part 12b of the operation part 12. The return spring 16 causes the operation part 12 to return to its initial position with an initial force applied at an upper surface of a lower flange of the bobbin 18 and a spring receiving part 12c of the operation part 12. A groove-shaped spring receiving part 18a that positions a lower end of the return spring 16 is formed on the upper surface of the lower flange of the bobbin 18. The spring receiving part 12c corresponds to the bottom of the outer cylindrical part of the operation part 12.

Figure 6:
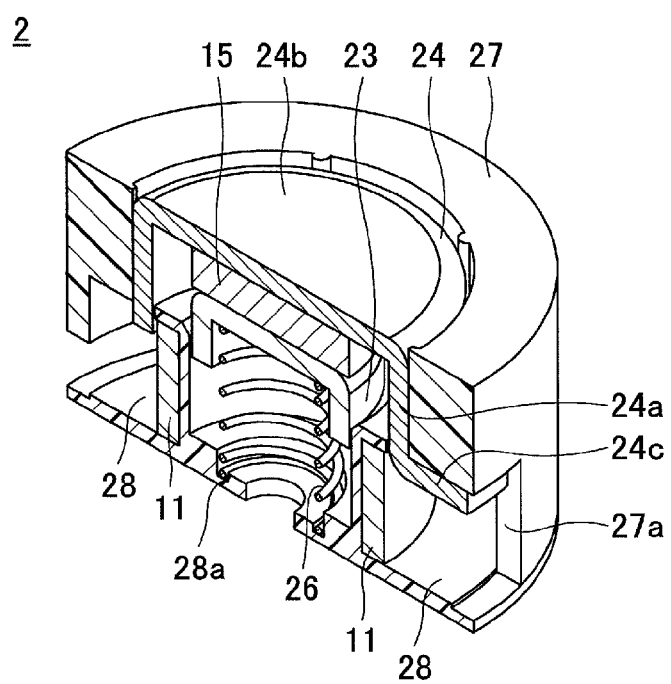
FIG. 6 is a perspective cross-sectional view of an operation input device 2, which is a second embodiment of the present invention.
Figure 7:
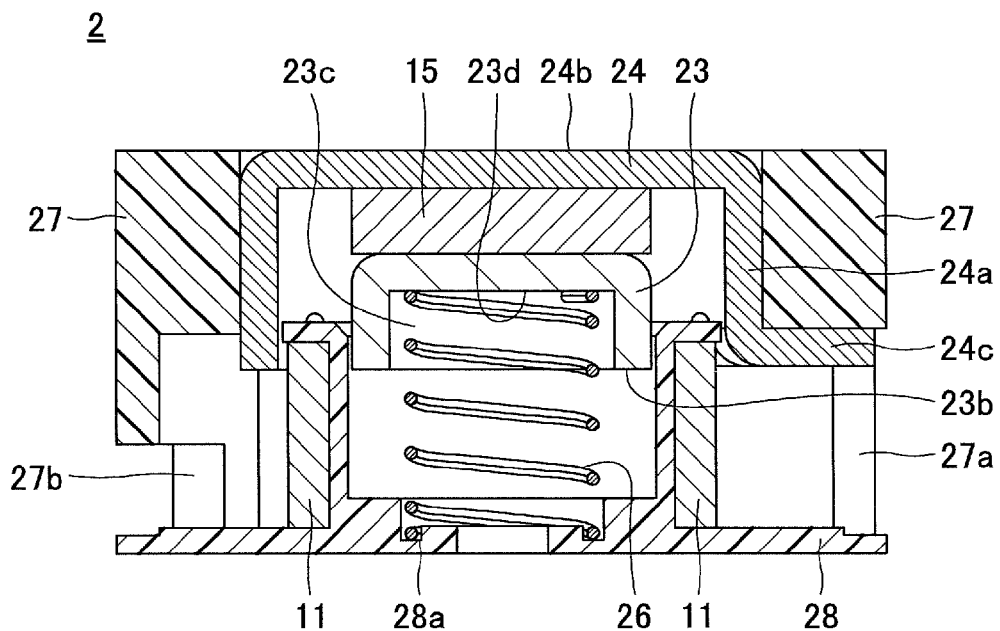
FIG. 7 is a front cross-sectional view of the operation input device 2.

FIG. 6 is a perspective cross-sectional view of an operation input device 2, which is a second embodiment of the present invention. FIG. 7 is a front cross-sectional view of the operation input device 2. A description of the same configurations and effects as those of the above-described embodiment is omitted.

The operation input device 2 includes a cup-shaped core 23 fixed to the lower surface 15b of the magnet 15. The core 23 may be formed by press forming or the like, and a recess 23c is formed on an end surface of the core 23 on the side facing toward the coil 11. As a result, it is possible to reduce cost and to reduce weight.

Figure 8:
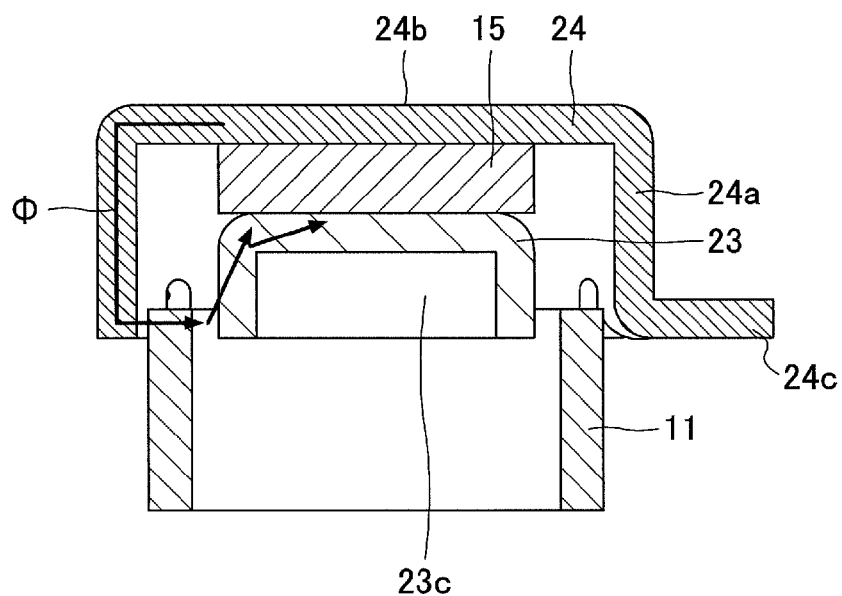
FIG. 8 is a front cross-sectional view of part of the operation input device 2.

The magnetic flux density of the magnet 15 increases toward the peripheral end of the magnet 15 from its central axis. Furthermore, as illustrated in FIG. 8, even when the recess 23c is provided, the length of the gap between a side surface part of the core 23 and a side surface part 24a of a yoke 24 remains unchanged. Therefore, even with the cup-shaped core 23, it is possible to maintain the efficiency of the magnetic circuit and a feedback force to apply vibrations to the operation part 12. Furthermore, because it is possible to reduce the weight of the core 23, which is a movable part, it is possible to improve the responsiveness of the yoke 24, which includes an operation part (operation surface) 24b. This results in a reduced cost of components and a better feeling of operation (feedback feeling).

Figure 9:
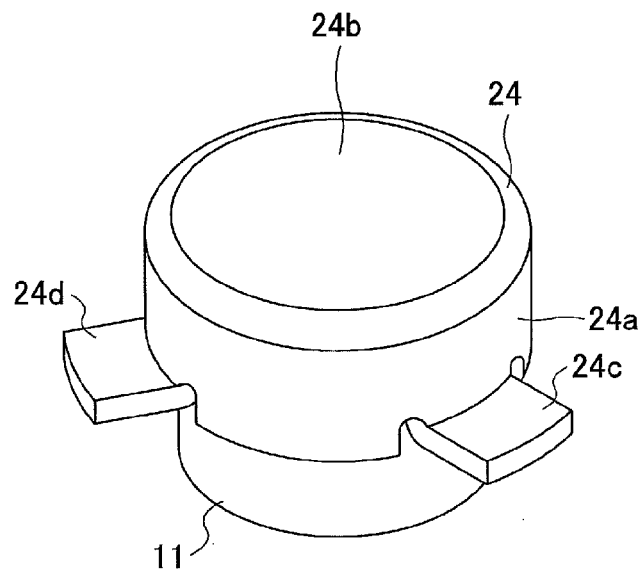
FIG. 9 is a perspective view illustrating flange parts 24c and 24d.

The yoke 24 may be manufactured by press working or the like. One or more outward projecting flange parts are formed on the side surface part 24a of the yoke 24. FIG. 9 illustrates two flange parts 24c and 24d. As illustrated in FIGS. 6 and 7, the flange part 24c and so on fit into grooves 27a and 27b, etc., provided in the case 27, so that it is possible to prevent the yoke 24 including the operation surface 24b from rotating around the axial directions of the coil 11. That is, the groove 27a and so on operate to stop the rotation of the yoke 24.

The operation input device 2 includes a return spring 26, which is provided inside the coil 11 and is smaller in diameter than the core 23. The return spring 26 is fixed to a spring receiving surface 23d of the core 23 and an upper surface of a bottom of a hollow part of a bobbin 28, and causes the yoke 24 to return to its initial position with an initial force. A lower end of the return spring 26 is positioned by a groove-shaped spring receiving part 28a formed on the upper surface of the bottom of the hollow part of the bobbin 28. An upper end of the return spring 26 fits in the recess 23c of the core 23 to be positioned. By using the recess 23c of the core 23, it is possible to increase the spring length of the return spring 24. Therefore, it is possible to make improvements in various spring characteristics, such as improvement in durability and reduction in spring rate.

Figure 10:
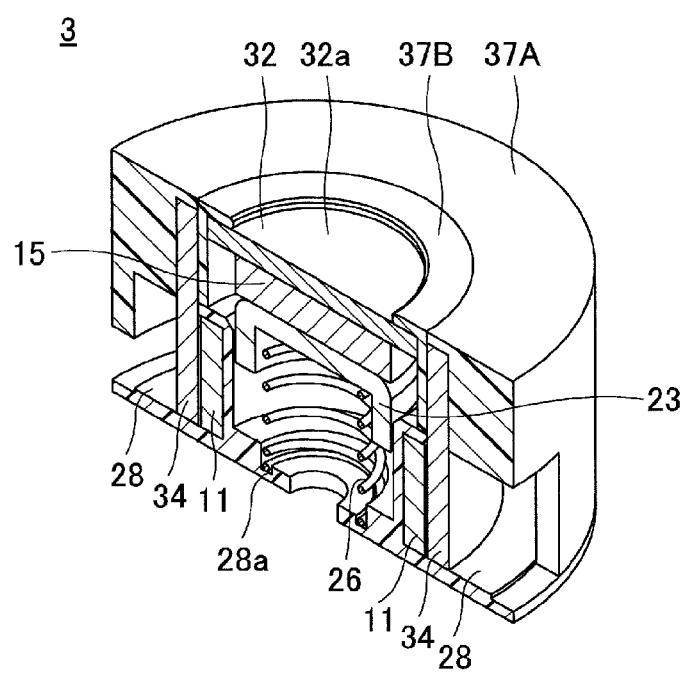
FIG. 10 is a perspective cross-sectional view of an operation input device 3, which is a third embodiment of the present invention.
Figure 11:
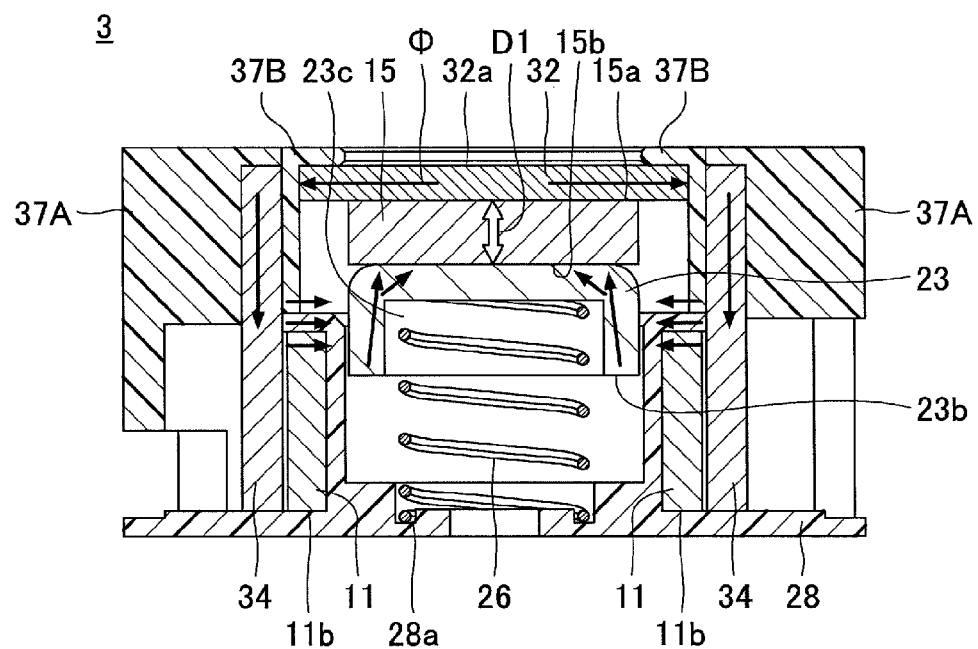
FIG. 11 is a front cross-sectional view of the operation input device 3.

FIG. 10 is a perspective cross-sectional view of an operation input device 3, which is a third embodiment of the present invention. FIG. 11 is a front cross-sectional view of the operation input device 3. A description of the same configurations and effects as those of the above-described embodiments is omitted.

According to the operation input device 3, the position of a yoke 34, which is provided outside the coil 11, is fixed. The yoke 34 is a cylindrical member where a cylindrical part is formed that has an inside diameter larger than the outside diameter of an operation part 32, which is of a yoke material. The cylindrical part of the yoke 34 vertically extends from a lower end 11b of the coil 11 to an upper end (upper surface) 32a of the operation part 32, and is fixed by a case 37A. Because the yoke 34 is immovable, being surrounded by the case 37A and the bobbin 28 to remain fixed, it is possible to reduce the weight of a movable part that is displaced by an operation input. Therefore, it is possible to improve responsiveness at the time of providing a feedback force.

The magnet 15 has an outside diameter smaller than the inside diameter of the coil 11, and is magnetized in the directions of its end surfaces in the magnetization directions D1, which are substantially equal to the operating directions of the operation part 32. The core 23 is fixed to the lower surface 15b of the magnet 15, and is smaller than the inside diameter of the coil 11. The operation part 32 is a disk-shaped member that is fixed to the upper surface 15a of the magnet 15 and includes the upper surface 32a on which an operation input acts. A case 37B prevents the operation part 32 from coming off. According to the operation input device 2, the magnet 15 and the core 23 are equally displaced downward by an operation input that acts on the operation part 32. Even when the magnet 15 and the core 23 moves in an axial direction of the coil 11 in the space inside the coil 11 to displace the operation part 32, the cylindrical yoke 34 does not move.

Figure 12:
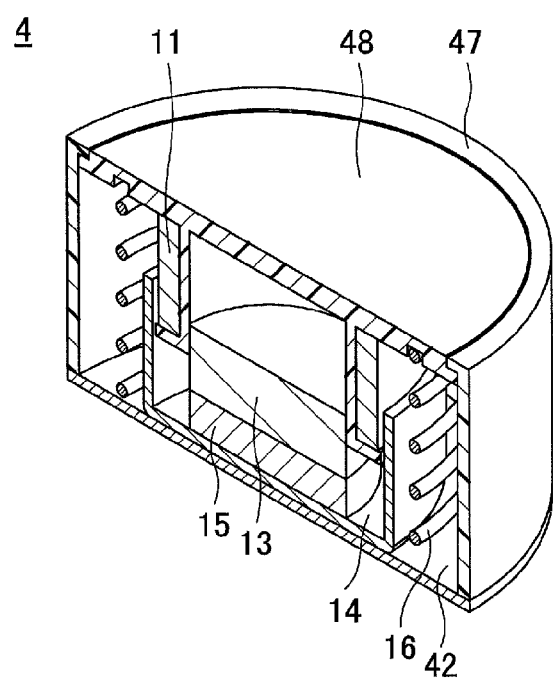
FIG. 12 is a perspective cross-sectional view of an operation input device 4, which is a fourth embodiment of the present invention.
Figure 13:
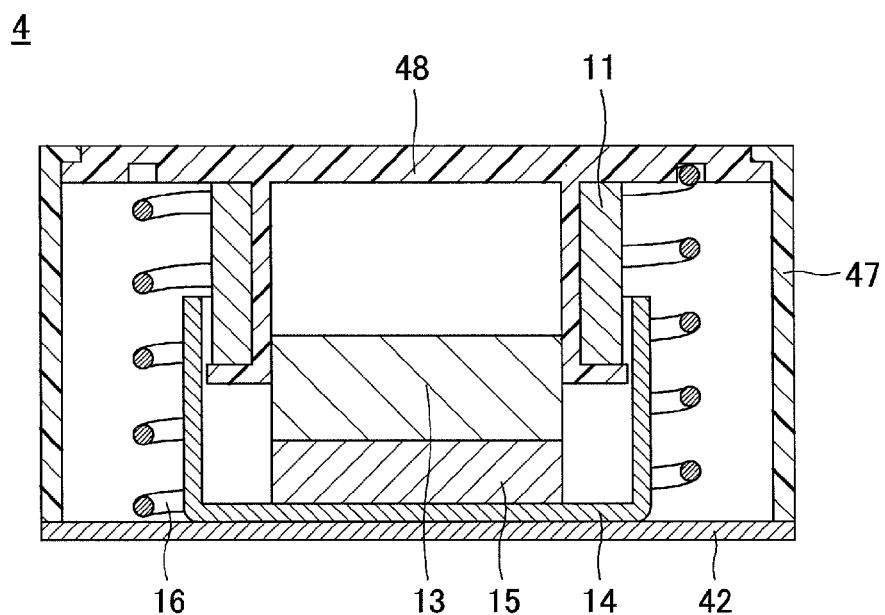
FIG. 13 is a front cross-sectional view of the operation input device 4.

FIG. 12 is a perspective cross-sectional view of an operation input device 4, which is a fourth embodiment of the present invention. FIG. 13 is a front cross-sectional view of the operation input device 4. A description of the same configurations and effects as those of the above-described embodiments is omitted.

According to the operation input device 4, the coil 11 is displaced by the displacement of an operation part 48 without displacing a magnetic circuit part formed of the core 13, the yoke 14, and the magnet 15. It is possible to improve responsiveness at the time of providing a feedback force by fixing a core, a yoke, and a magnet, whose principal component is iron, instead of making them movable. The operation part 48 operates as a bobbin of the coil 11 as well. This configuration may be applied to other operation input devices of the present application, for example.

Figure 14:
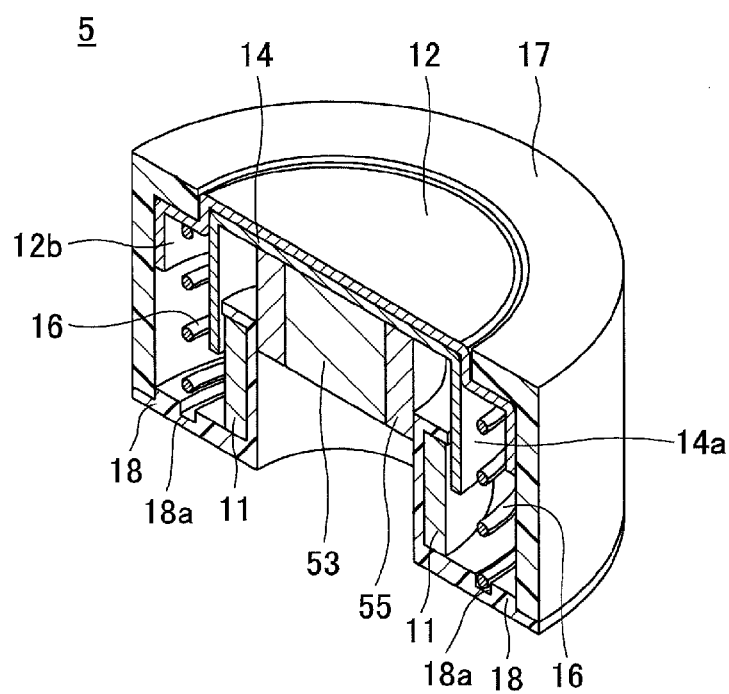
FIG. 14 is a perspective cross-sectional view of an operation input device 5, which is a fifth embodiment of the present invention.
Figure 15:
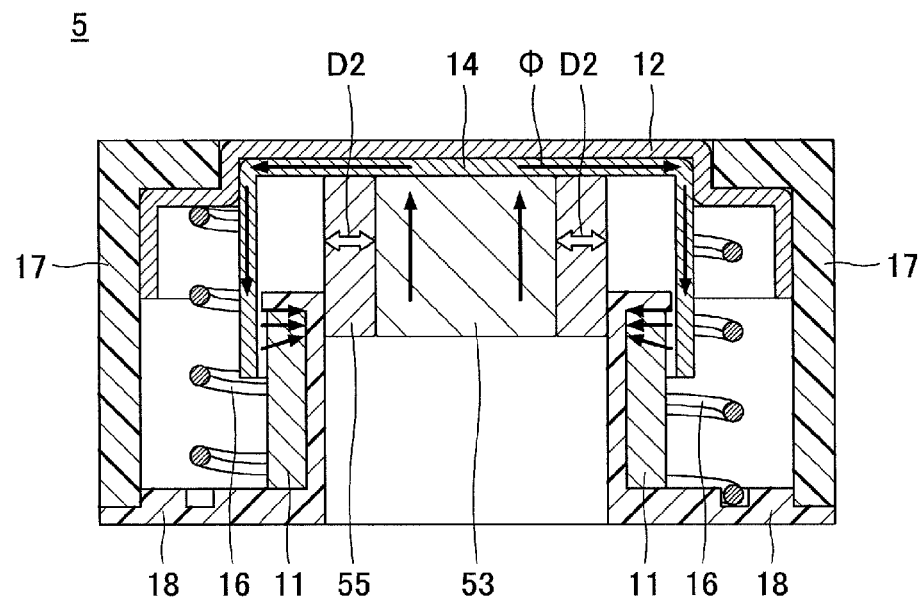
FIG. 15 is a front cross-sectional view of the operation input device 5.

FIG. 14 is a perspective cross-sectional view of an operation input device 5, which is a fifth embodiment of the present invention. FIG. 15 is a front cross-sectional view of the operation input device 5. A description of the same configurations and effects as those of the above-described embodiments is omitted.

According to the operation input device 5, a cylindrical magnet 55, in which a cylindrical part having an outside diameter smaller than the inside diameter of the coil 11 is formed, generates a magnetic flux in a magnetic circuit. The cylindrical part of the magnet 55 is magnetized in the directions of its end surfaces in magnetization directions D2, which are substantially perpendicular to the operating directions of the operation part 12 (the axial directions of the coil 11). A core 53 is formed into a columnar shape, and fits inside the cylindrical part of the magnet 55 to be fixed. According to the operation input device 5, the magnet 55, the core 53, and the yoke 14 are equally displaced downward by an operation input that acts on the operation part 12. The magnet 55 and the core 53 move in an axial direction of the coil 11 in the space inside the coil 11, and the side surface part 14a of the cylindrical yoke 14 moves along the exterior side surface of the coil 11 in the space outside the coil 11.

Figure 16:
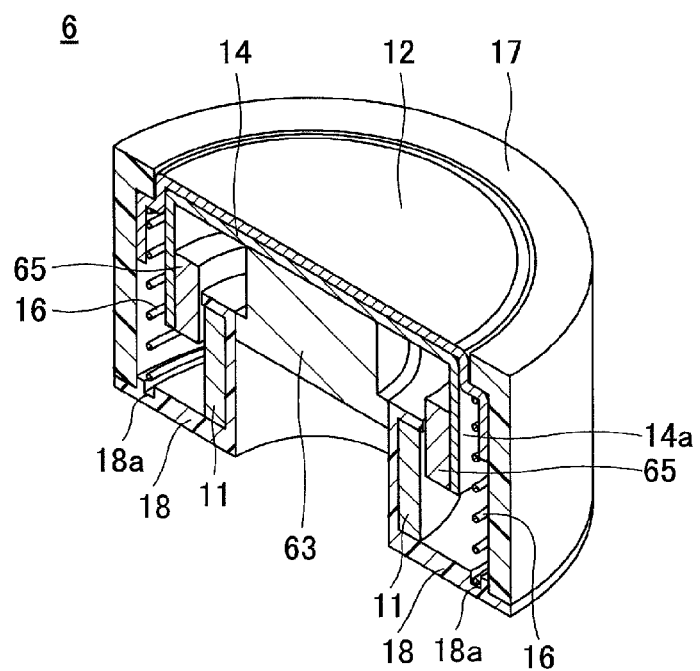
FIG. 16 is a perspective cross-sectional view of an operation input device 6, which is a sixth embodiment of the present invention.
Figure 17:
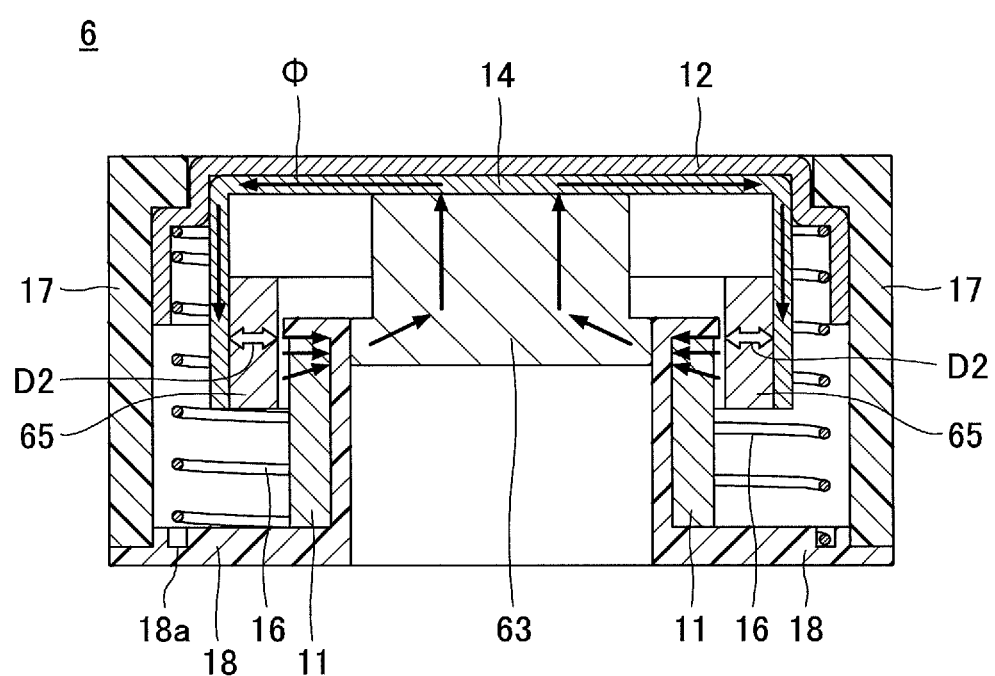
FIG. 17 is a front cross-sectional view of the operation input device 6.

FIG. 16 is a perspective cross-sectional view of an operation input device 6, which is a sixth embodiment of the present invention. FIG. 17 is a front cross-sectional view of the operation input device 6. A description of the same configurations and effects as those of the above-described embodiments is omitted.

According to the operation input device 6, a cylindrical magnet 65, in which a cylindrical part having an inside diameter larger than the outside diameter of the coil 11 is formed, generates a magnetic flux in a magnetic circuit. The cylindrical part of the magnet 65 is magnetized in the directions of its end surfaces in the magnetization directions D2, which are substantially perpendicular to the operating directions of the operation part 12 (the axial directions of the coil 11). The cylindrical magnet 65 fits inside the side surface part 14a of the cup-shaped yoke 14 to be fixed. A core 63, which is formed into a columnar shape, is fixed to a lower surface of the yoke 14 and slidably fits inside a cylindrical part of the bobbin 18. The yoke 14 is a cylindrical member that has an inside diameter larger than the outside diameter of the coil 11 and the outside diameter of the cylindrical magnet 65. According to the operation input device 6, the magnet 65, the core 63, and the yoke 14 are equally displaced downward by an operation input that acts on the operation part 12. The core 63 moves in an axial direction of the coil 11 in the space inside the coil 11, and the cylindrical part of the magnet 65 and the side surface part 14a of the cylindrical yoke 14 move along the exterior side surface of the coil 11 in the space outside the coil 11. The cylindrical magnet 65 may be divided into pieces.

Next, a description is given of a detection part that detects a change in the inductance of the coil 11 and a control part that causes the operation part 12 to move by causing an electric current to flow through the coil 11.

The detection part is a detection part that outputs a detection signal corresponding to the successively changing analog amount of the displacement of the operation part by electrically detecting a change in the inductance of the coil.

For example, the detection part detects a physical quantity that changes equivalently to a change in the inductance of the coil, and outputs the detected value of the physical quantity as a value equivalent to the amount of the displacement of the operation part. Alternatively, the detection part may calculate the inductance of the coil by detecting a physical quantity that changes equivalently to a change in the inductance of the coil and output the calculated value of the inductance as a value equivalent to the amount of the displacement of the operation part. Alternatively, the detection part may calculate the amount of the displacement of the operation part from the detected value of the physical quantity or the calculated value of the inductance and output the calculated value of the amount of the displacement.

Specifically, it is preferable that the detection part cause a signal waveform that varies in accordance with the magnitude of the inductance of the coil to be generated in the coil by feeding a pulse signal to the coil and electrically detect a change in the inductance of the coil based on the signal waveform.

For example, as the amount of the downward displacement of the operation part in the region above the upper end surface of the coil increases, the magnetic permeability around the coil increases, so that the inductance of the coil increases. As the inductance of the coil increases, the amplitude of the waveform of a pulse voltage generated across the coil by the feeding of the pulse signal increases. Therefore, by determining the amplitude as a physical quantity that changes equivalently to a change in the inductance of the coil, the detection part may detect the amplitude and output the detected value of the amplitude as a value equivalent to the amount of the displacement of the operation part. Alternatively, the detection part may calculate the inductance of the coil from the detected value of the amplitude and output the calculated value of the inductance as a value equivalent to the amount of the displacement of the operation part.

Furthermore, as the inductance of the coil increases, the slope of the waveform of a pulse electric current caused to flow through the coil by the feeding of the pulse signal becomes moderate. Therefore, by determining the slope as a physical quantity that changes equivalently to a change in the inductance of the coil, the detection part may detect the slope and output the detected value of the slope as a value equivalent to the amount of the displacement of the operation part. Alternatively, the detection part may calculate the inductance of the coil from the detected value of the slope and output the calculated value of the inductance as a value equivalent to the amount of the displacement of the operation part.

The detection part is a detection part that, for example, detects a change in the inductance of the coil by feeding a first pulse signal to the coil. The detection part detects a change in the inductance of the coil based on a pulse voltage (a first pulse voltage) generated across the coil by the feeding of a pulse current (a first pulse current) corresponding to the first pulse signal to the coil. It is possible to calculate the amount of the displacement of the operation part in accordance with the result of the detection of a change in the inductance of the coil.

On the other hand, the control part is a control part that, for example, causes a magnetic field that causes the operation part to move to be generated by feeding the coil with a second pulse signal that is different in phase from the first pulse signal. A force to attract the operation part and the core to or move the operation part and the core away from the coil is generated by a magnetic field generated by the flowing of a pulse current (a second pulse current) corresponding to the second pulse signal through the coil. The operation part is caused to vibrate by variations in the magnitude of a force generated by the feeding of the second pulse signal to the coil. That is, because the second pulse signal is a signal whose amplitude temporarily changes, it is possible to vary the magnitude of a force applied to the operation part.

The first pulse signal and the second pulse signal may be rectangular waves, triangular waves, or sawtooth waves.

Figure 18:
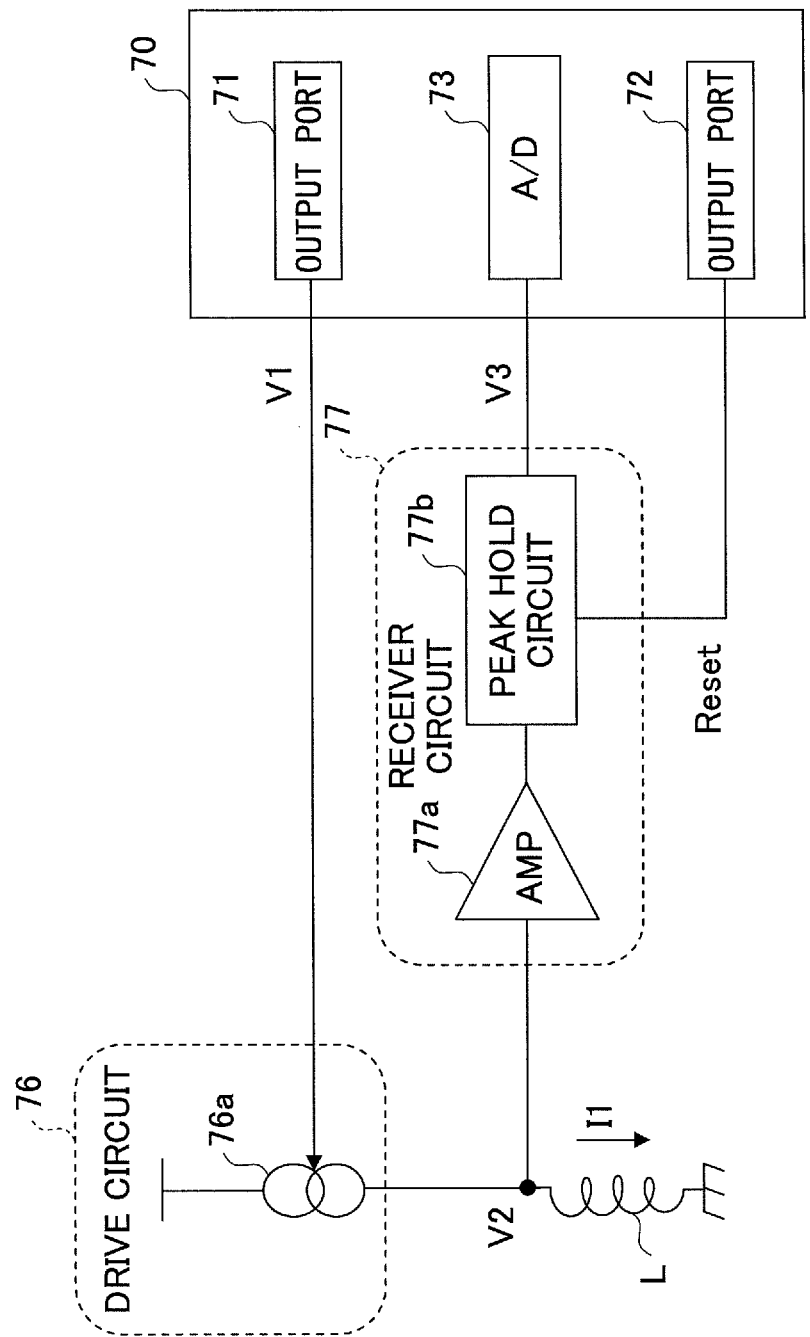
FIG. 18 is a block diagram of a first example of a control circuit that includes a detection part that detects a change in inductance and a control part that causes an operation part to move.

FIG. 18 is a block diagram of a first example of a control circuit that includes a detection part that detects a change in inductance and a control part that causes an operation part to move. The control circuit is a calculation part that detects a change in the inductance of a coil L. The control circuit includes an operation circuit 70 such as a CPU, a drive circuit 76 connected to a first output port 71 of the operation circuit 70, and a receiver circuit 77 connected to a second output port 72 and an AD port 73 of the operation circuit 70. The coil L is connected to the operation circuit 70 through the receiver circuit 77 and the drive circuit 76.

The drive circuit 76 causes an electric current to flow through the coil L by controlling the output current of a constant current source (constant current circuit) 76a in accordance with an output signal from the output port 71 of the operation circuit 70. The receiver circuit 77 inputs a voltage generated as a result of causing an electric current to flow through the coil L to a peak hold circuit 77b through an amplifier 77a (which may alternatively be input to a bottom hold circuit). A peak value (analog value) held by the peak hold circuit 77b is input to the AD port 73 to be converted into a digital value by an AD converter.

Figure 19:
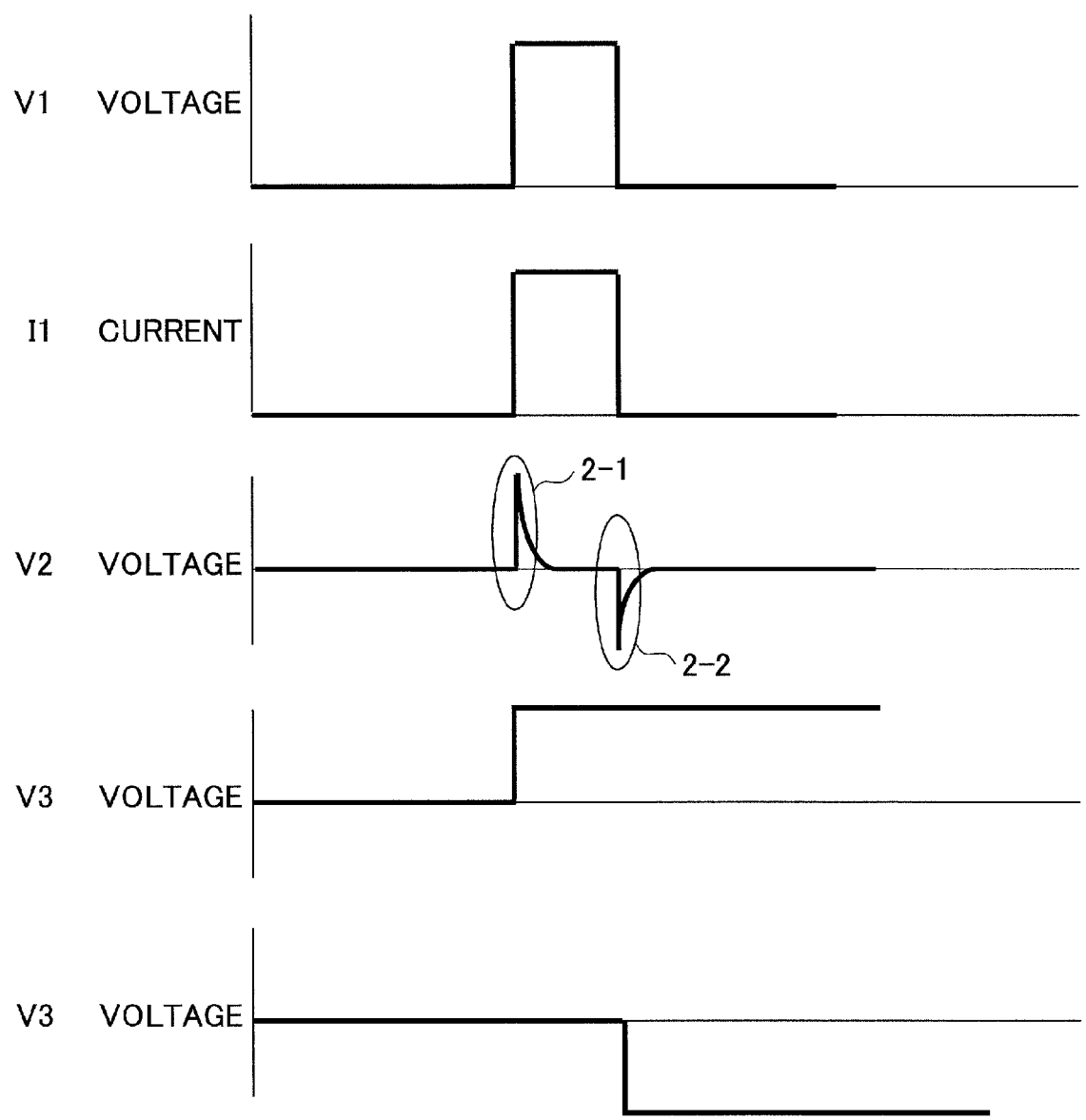
FIG. 19 is a chart illustrating waveforms at points in FIG. 18.

FIG. 19 is a chart illustrating waveforms at points in FIG. 18. A voltage waveform of a rectangular wave is output from the output port 71 of the operation circuit 70. This voltage causes the constant current circuit 76a to cause a constant electric current to flow through the coil L. As a result, the coil L causes a voltage V2 of a differential waveform to be generated. As the voltage waveform V2, a waveform 2-1 synchronized with the rise of the voltage waveform V1 and a waveform 2-2 synchronized with the fall of the voltage waveform V1 are obtained. The waveform 2-2 is opposite in polarity to the waveform 2-1. The amplifier 77a amplifies the voltage waveform V2 to a size suitable for the dynamic range of the AD converter. By holding a peak or bottom of the voltage waveform V2, the held value is input to the AD converter (AD port 73). The amplitude values of the waveforms 2-1 and 2-2 increase in proportion to the magnitude of the inductance of coil L. Therefore, it is possible to evaluate the inductance of the coil L by detecting these amplitude values.

Figure 20:
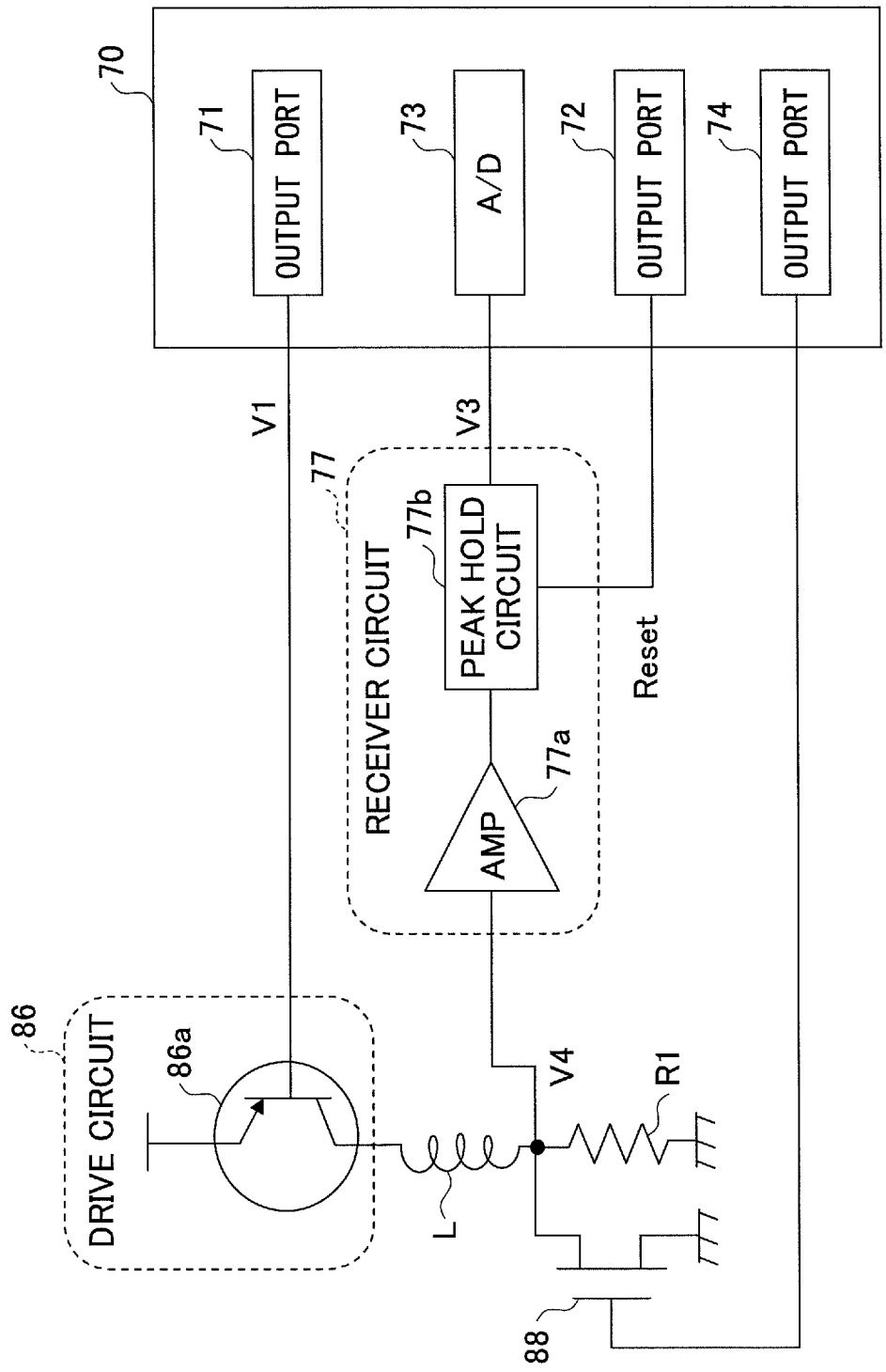
FIG. 20 is a block diagram of a second example of a control circuit that includes a detection part that detects a change in inductance and a control part that causes an operation part to move.

FIG. 20 is a block diagram of a second example of a control circuit that includes a detection part that detects a change in inductance and a control part that causes an operation part to move.

A drive circuit 86 applies a constant voltage output to the coil L by controlling a transistor 86a in accordance with an output signal from the output port 71 of the operation circuit 70. A resistor R1 is connected between the coil L for detecting operations and ground to form a low-pass filter of the coil L and the resistor R1. A voltage V4 generated between the coil L and the resistor R1 (a voltage across the resistor R1) is input to the peak hold circuit 77b through the amplifier 77a. A peak value (analog value) held by the peak hold circuit 77b is input to the AD port 73 to be converted into a digital value by an AD converter.

A switch element 88, which is connected in parallel with the resistor R1, is turned OFF when a pulse for detecting the amount of the displacement of the operation part is applied. On the other hand, in exciting the coil L at the time of applying a feedback pulse for applying a vibration to the operation part, it is required to prevent impedance at the resistor R1 from increasing to prevent a required amount of applied electric current from flowing. Therefore, the switch element 88 is turned ON in synchronization with the application of a feedback pulse in response to an output signal from an output port 74 of the operation circuit 70.

Figure 21:
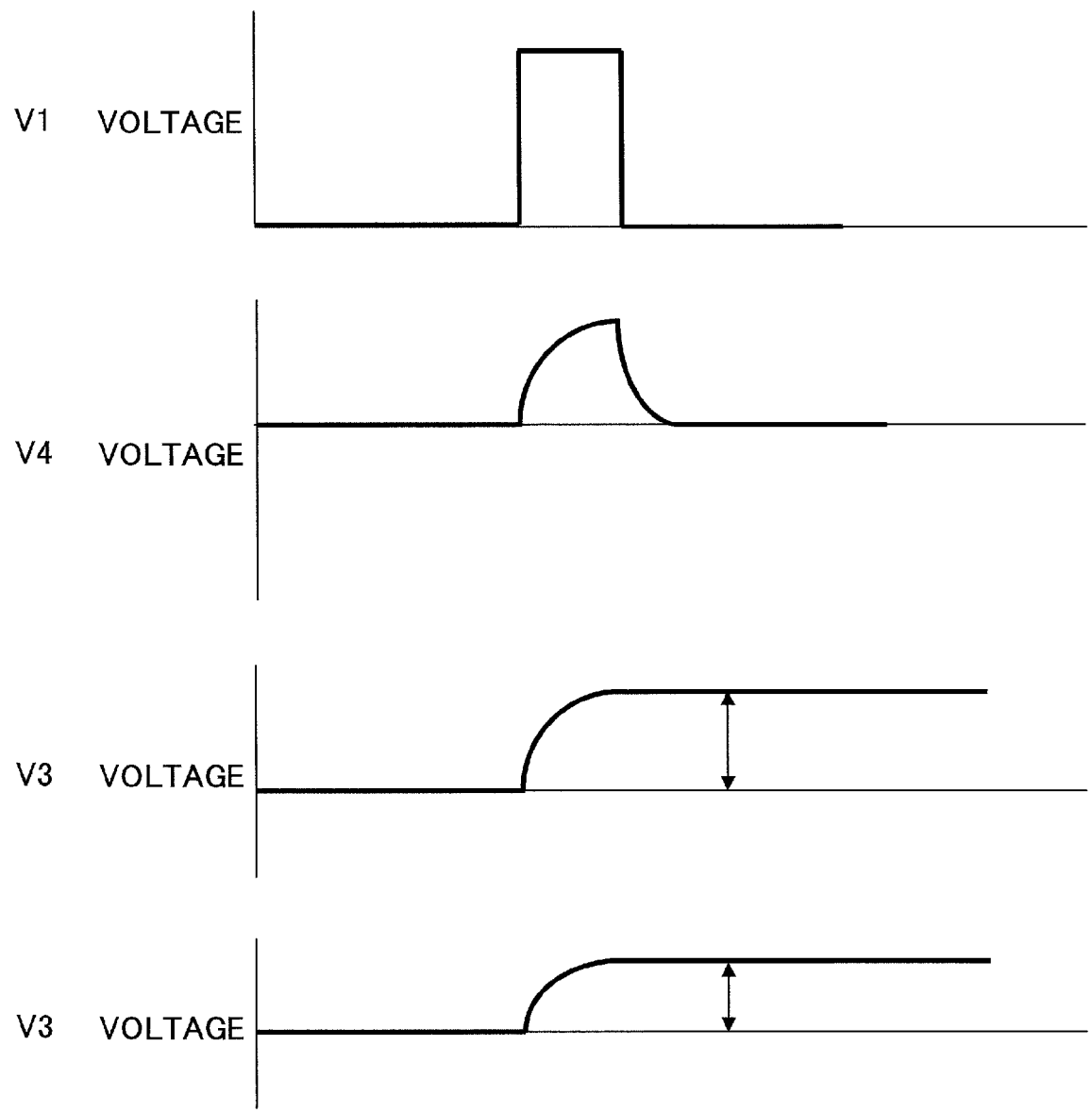
FIG. 21 is a chart illustrating waveforms at points in FIG. 20.

FIG. 21 is a chart illustrating waveforms at points in FIG. 20. A voltage waveform of a rectangular wave is output from the output port 71 of the operation circuit 70. This voltage causes the drive circuit 86 to apply a constant voltage to the coil L. The voltage waveform V4 as illustrated in the drawing is generated by setting the time constant of the coil L and the resistor R1 to the width of the rectangular wave pulse or more. The amplifier 77a amplifies this voltage waveform V4 to a size suitable for the dynamic range of the AD converter. By holding a peak of the voltage waveform V4, the held value is input to the AD converter (AD port 73). The amplitude value of a voltage waveform V3 decreases in inverse proportion to the magnitude of the inductance of the coil L. Therefore, it is possible to evaluate the magnitude of the inductance of the coil L by detecting this amplitude value.

Figure 22:
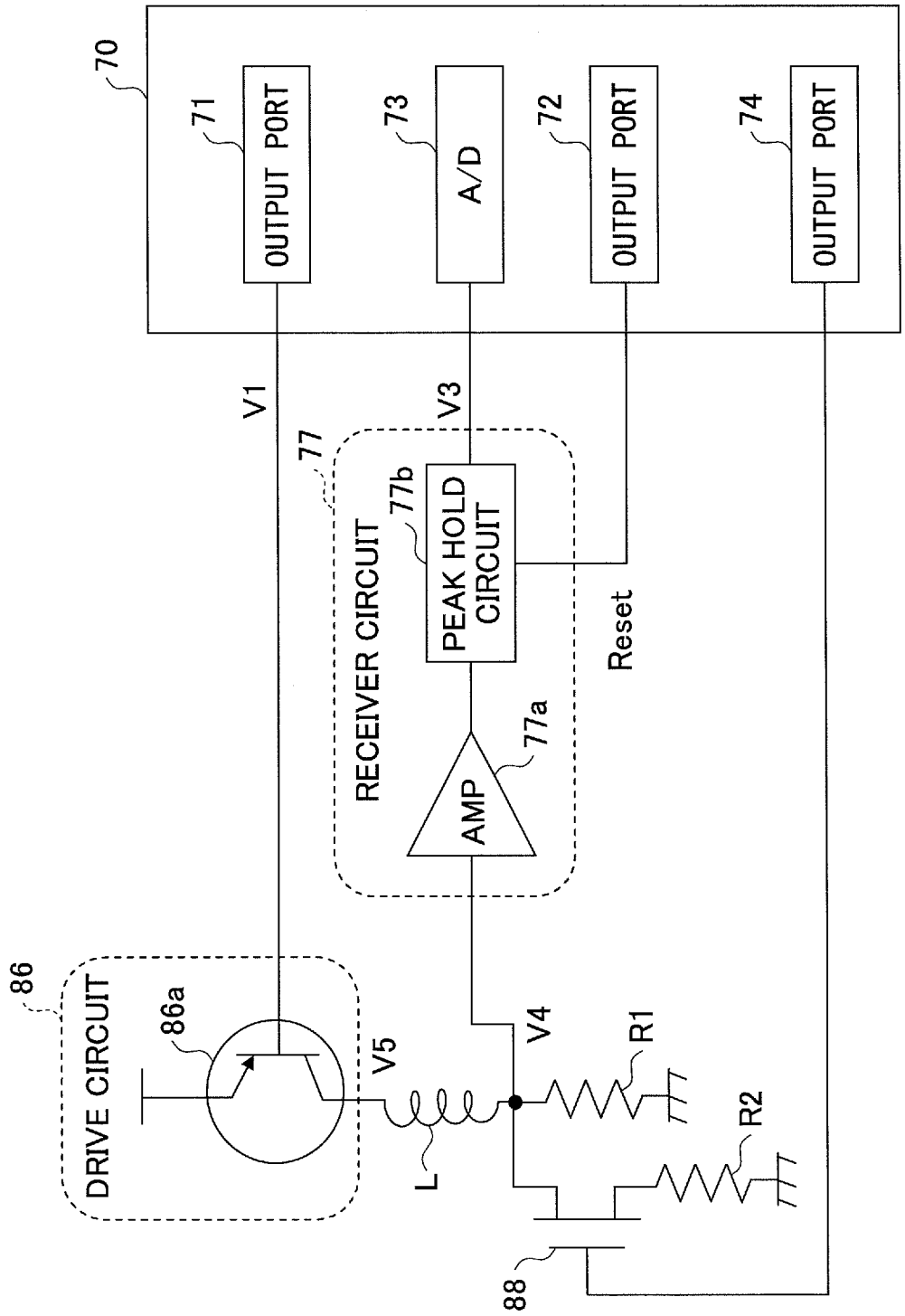
FIG. 22 is a block diagram of a third example of a control circuit that includes a detection part that detects a change in inductance and a control part that causes an operation part to move.

FIG. 22 is a block diagram of a third example of a control circuit that includes a detection part that detects a change in inductance and a control part that causes an operation part to move.

In the control circuit of FIG. 22, the resistor R1 is set to have a small variation error of the resistance value relative to temperature compared with the internal resistance (resistance component) of the coil L. In the case of this setting, the continuous outputting of a feedback force makes it possible to detect an increase in the resistance value due to an increase in the temperature of the internal resistance of the coil L by evaluating the voltage waveform V4 at the time of the application of a rectangular wave to the coil L.

For example, it is assumed that the inductance of the coil L is 0.6 mH when the operation part is in its initial position and is 1.0 mH when the operation part is depressed to the maximum. In this case, letting a control pulse of a rectangular wave output from the output port 71 be set to a width of 2 μsec and letting the resistance R1 be 470Ω, the time constant of a filter formed of the coil L and the resistor R1 is 1.28 μsec. Letting an applied voltage V5 output from the drive circuit 86 be 3 V and letting the internal resistance of the coil L be set to 15Ω, the voltage waveform V3 is approximately 2.33 V when the operation part is in its initial position, and the voltage waveform V3 is approximately 1.77 V when the operation part is displaced to the maximum. Thus, the voltage waveform V3 changes in accordance with the amount of the displacement of the operation part. Therefore, it is possible to detect the amount of the depression of the operation part by detecting the voltage waveform V3.

Here, the width of the control pulse is determined to be substantially greater than the time constant determined by the coil L and the resistor R1 (or the control pulse is determined to be a direct current signal), and voltage is applied to the coil L. Then, based on the voltage dividing ratio of the internal resistance of the coil L and the resistor R1, the voltage waveform V3 becomes 2.91 V (=3 V×470Ω/(470+15)Ω). This 2.91 V is determined to be the voltage value of the voltage V3 at a normal temperature of 23 degrees.

Common windings used for coils have a temperature characteristic of 0.4%/C°, while resistor elements range from those having large temperature characteristics to those having small temperature characteristics, of which even those of approximately 0.01%/C° are easily available. Therefore, when an element having an internal resistance value whose temperature characteristic is 0.4%/C° is used as the coil L and an element having a resistance value whose temperature characteristic is 0.01%/C° is used as the resistor R1, the voltage value of the voltage V3 at the time when the coil L is at 100° C., which is the heating upper limit value of the internal temperature of the coil L, is reduced to 2.88 V, compared with 2.91 V at the normal temperature. When a voltage difference of 30 mV due to this temperature change is detected in the AD converter subsequent to the control circuit, the method of outputting a pulse signal to the coil L is changed or the outputting is stopped. This makes it possible to prevent the coil L from being damaged before the internal temperature of the coil L goes beyond an allowable range.

Furthermore, sensitivity for detecting a change in the temperature of the internal resistance of the coil L may be increased by providing a resistor R2 for measuring the internal resistance of the coil L between the switch element 88 and ground, separately from the resistor R1 for detecting a change in the inductance. The switch element 88 is an element for increasing the value of an electric current flowing through the coil L by reducing impedance at the time of applying a feedback pulse. For example, when an element having a resistance value of 2Ω, whose temperature characteristic is 0.01%/C°, is used as the resistor R2 and an element having an internal resistance value of 15Ω, whose temperature characteristic is 0.4%/C°, is used as the coil L, it is possible to increase the voltage difference between the voltage V3 at a normal temperature of 25 C.° and the voltage V3 at a high temperature of 100 C.° to 74 mV, compared with the voltage difference of 30 mV in the case where the resistor R2 is not provided. Therefore, it is possible to reduce the detection error of the voltage difference.

FIG. 23 is a waveform chart at the time of putting an operation input device into operation.

An operation control method for an operation input device includes an inductance detecting step of detecting a change in the inductance of the coil L by feeding a first pulse signal to the coil L. In its inductance detecting step, the operation circuit 70 outputs, from the output port 71, pulse waveforms p (p1 through p9) corresponding to the first pulse signal fed to the coil L as the voltage waveform V1 of a rectangular wave as illustrated in (b). The pulse waveforms p are intermittently output from the output port 71 to the coil L, so that the first pulse signal is intermittently fed to the coil L. Furthermore, the inductance detecting step is repeated at regular intervals, so that each of the pulse waveforms p1 through p9 of the voltage waveform V1 is output at regular intervals. The pulse waveforms p are a driving voltage for detecting a change in the inductance of the coil L.

The driving voltage V1 causes the detection voltage V3, associated with an increase in the inductance, to be generated as illustrated in (c) in accordance with the amount of depression W of the operation part illustrated in (a). When the amount of depression W changes as illustrated in (a), the amplitude of the detection voltage V3 also increases in proportion to the amount of depression W. The amplitudes of pulse waveforms s3, s4, and s5 of the detection voltage V3 increase as the amount of depression W increases, and the amplitudes of pulse waveforms s6 and s7 of the detection voltage V3 decrease as the amount of depression W decreases. When there is no change in the amount of depression W, the amplitudes of pulse waveforms of the detection voltage V3 are equal (s1, s2, s8, and s9).

Furthermore, the operation control method for an operation input device includes a magnetic field generating step of generating a magnetic field H that causes the operation part to be moved by a core or a yoke by feeding the coil L with a second pulse signal, which is different in phase from the first pulse signal fed in the inductance detecting step. In its magnetic field generating step, the operation circuit 70 outputs, from the output port 71, pulse waveforms q (q1 through q5) corresponding to the second pulse signal fed to the coil L as the voltage waveform V1 of a rectangular wave as illustrated in (b). The pulse waveforms q are output from the output port 71 to the coil L, so that the second pulse signal is fed to the coil L. With the outputting of the pulse waveforms q, a force F to attract the operation part toward the coil L is generated as illustrated in (e).

FIG. 23 illustrates a control method that outputs the pulse waveforms q1 through q5 in accordance with the amplitude of the detection voltage V3, which is the result of the detection of a change in the inductance. That is, no pulse waveforms q are output in the case of the detection voltage V3 whose amplitude is less than a predetermined threshold, and when the detection voltage V3 whose amplitude is more than or equal to the predetermined threshold is generated, the pulse waveforms q corresponding to the amplitude of the detection voltage V3 are output. That is, the pulse waveforms q, which cause the displacement of the operation part to be generated in accordance with the amount of depression W, are generated with amplitude proportional to the amplitude of the detection voltage V3. Then, the attraction force F of magnitude corresponding to the amplitude of the pulse waveforms q is generated.

The amplitude voltage, pulse width, and output intervals of the pulse waveforms p for detecting a change in the inductance may be of such size as to allow detection of a change in the inductance with the detection voltage V3 and of such size as to prevent generation of the magnetic field H, which makes it possible to cause the displacement of the operation part that may be sensed by an operator. As a result, it is possible to prevent an operator from sensing the displacement of the operation part every time a change in the inductance is detected. On the other hand, in order to ensure that the displacement of the operation part caused by the pulse waveforms q is sensed by an operator, the amplitude voltage, pulse width, and output intervals of the pulse waveforms q may be of such size as to cause generation of the magnetic field H, which makes it possible to cause the displacement of the operation part that may be sensed by an operator. For example, at least one of the amplitude voltage and the pulse width of the pulse waveforms q is greater than that of the pulse waveforms p.

At this point, for example, a reset signal VR for preventing the receiver circuit 77 from operating may be generated during a period in which the pulse waveforms q are at least generated as illustrated in (d), in order to prevent the operation circuit 70 from wrongly detecting, as a signal representing a change in the inductance, the detection voltage V3 generated by the outputting of the pulse waveforms q for causing the displacement of the operation part, which would otherwise be the case. As a result, it is possible to prevent generation of the detection voltage V3 during a period in which the pulse waveforms q are output as illustrated in (c). Alternatively, because the pulse waveforms q are output by the operation circuit 70 itself, the operation circuit 70 may not evaluate (may ignore) the detection signal V3 generated with the pulse waveforms q as a signal representing a change in the inductance.

Furthermore, (b) illustrates a control method by which the pulse waveforms q of amplitude corresponding to the magnitude of the amount of depression W are output, while a control method is also possible that causes the displacement of the operation part by outputting the pulse waveforms q of pulse width corresponding to the magnitude of the amount of depression W as illustrated in (f). As the amount of depression W increases, the pulse width of the pulse waveforms q is increased.

Furthermore, as illustrated in (g), an alternative control method is also possible that causes the displacement of the operation part by outputting the pulse waveforms q of a number corresponding to the magnitude of the amount of depression W. As the amount of depression W increases, the number of pulse waveforms q is increased.

Furthermore, because the pulse waveforms q do not necessarily have to be in synchronization with the pulse waveforms p depending on an application that uses this operation input device (for example, an electronic device used by an operator, more specifically, a game device or a cellular phone), time intervals at which the pulse waveforms q are generated (the output intervals of the pulse waveforms q) may be changed over two or more of the pulse waveforms p as illustrated in (h). The pulse waveforms p for detecting a change in the inductance correspond to the temporal resolution (follow-up rate) of the detection of a change in the inductance. Therefore, it is desirable that the pulse waveforms p be output at short time intervals. On the other hand, the pulse waveforms q for causing the displacement of the operation part are required to cause an operator to sense the occurrence of the displacement of the operation part. Therefore, the pulse waveforms q are output at longer intervals than the pulse waveforms p. For example, as illustrated in (h), the pulse waveforms q may be output during a period in which no pulse waveforms p are output, so that the pulse waveforms q do not overlap the pulse waveforms p.

Furthermore, when the output intervals of the pulse waveforms p are reduced, so that no time is secured for outputting the pulse waveforms q, the pulse waveforms q may be preferred to the pulse waveforms p, and the outputting of the pulse waveforms p may be stopped during a period in which the pulse waveforms q are output.

Furthermore, in the case of FIG. 23, the operation part is displaced in accordance with the amount of depression W, while the way of flowing of an electric current that flows through the coil is changed by changing the mode of feeding the pulse waveforms q, so that it is possible to change the mode of vibrations applied to an operator. For example, by changing the way of flowing of an electric current that is caused to flow through the coil by changing the mode of feeding the second pulse signal, it is possible to change the strength, the vibration frequency, and the number of times of the vibrations applied to an operator. Furthermore, the timing of occurrence of the displacement of the operation part may be changed not only by the amount of depression W but also by the speed at which the operation part is depressed, a position to which an object (for example, a cursor or pointer on a display) moved by an operation of the operation part is moved, or the occurrence of an event on an application for which the operation input device is used. For example, a magnetic field that displaces the operation part by feeding the second pulse signal to the coil is generated when the amount of depression W of the operation part reaches a predetermined value. By the displacement of the operation part thus caused, it is possible to cause an operator to have a click feeling.

Thus, in the case of the above-described embodiments of the present invention, it is possible to generate vibrations solely by applying, for feedback purposes, voltage to a coil of which inductance is detected. For example, by changing the frequency, voltage, intervals or the like of waveforms output from a drive circuit of a detection circuit part for detecting inductance, it is possible to implement an operation part detecting function and a vibration generating function. Thus, the configuration is extremely simple, and no additional actuator is necessary.

A method of vibrating a whole product (for example, a controller) including an operation input device, such as a so-called vibration motor, is capable of causing changes solely by the strength and time of vibrating the whole product. According to the embodiments of the present invention, however, a change in force may be output directly to the operation part. Therefore, for example, when multiple operation input devices are provided, it is possible to output feedback to (it is possible to vibrate) each of the operation input devices. Furthermore, because it is possible to prevent feedback vibrations from being transmitted to a hand holding a product like a controller, it is possible to provide a direct feeling.

Furthermore, it is necessary for the vibration motor to increase the rotation speed to increase the amplitude of vibration, so that it takes time before the rotation increases, thus resulting in low responsiveness. Furthermore, it is impossible to control the vibration frequency and vibrations independently. According to the embodiments of the present invention, however, a force is output to the operation part alone, which is a relatively light part. Therefore, by changing output pulses, it is possible to output a feeling such as a click feeling with a single pulse or to output a feeling such as vibration by repeating a pulse. Furthermore, because the amplitude, frequency, and pulse width may be freely changed, it is possible to change a feeling as required.

A detailed description is given above of preferred embodiments of the present invention. The present invention, however, is not limited to the above-described embodiments, and variations, modifications, or replacements may be added to the above-described embodiments without departing from the scope of the present invention. The configurations of parts of the above-described embodiments may be combined.

For example, the support member that elastically supports the operation part is not limited to an elastic member such as a return spring, and may be a rubber member, a sponge member, or a cylinder filled with air or oil.

Furthermore, an operation input device of the present invention may be operated not only with a hand or finger but also with a palm or even with a toe or sole.

Furthermore, a surface touched by an operator may be a flat surface, a depressed surface, or a projecting surface.

The present international application is based upon and claims the priority of Japanese Patent Application No. 2011-100197, filed on Apr. 27, 2011, the entire contents of which are incorporated herein by reference.

DESCRIPTION OF THE REFERENCE NUMERALS 1-6 operation input device
11 coil
11a upper end surface
11b lower end
12 operation part (yoke)
12a, 12b side surface part
12c spring receiving part
13 core
13a upper surface
13b lower surface
14 yoke
14a side surface part
14b upper surface
15 magnet
15a upper surface
15b lower surface
16 return spring
17 case
17a groove
18 bobbin
18a spring receiving part
23 core
23b lower surface
23c recess
23d spring receiving surface
24 yoke
24a side surface part
24b operation surface (operation part)
24c, 24d flange part
26 return spring
27 case
27a, 27b groove
28 bobbin
28a spring receiving part
32 yoke (operation part)
32a upper end
34 yoke
37A, 37B case
42 yoke
47 case
48 bobbin (operation part)
53 core
55 magnet
63 core
65 magnet
70 operation circuit
76 drive circuit
77 receiver circuit
D1, D2 magnetization direction
Φ magnetic flux
S1, S2 region

The invention claimed is:
1. An operation input device, comprising:
a coil;

an operation part configured to be displaced in an axial direction of the coil by an action of an operation input;

a core whose positional relationship with the coil is changed by a displacement of the operation part;

a yoke placed outside the coil; and a magnet configured to generate a magnetic flux that flows through the core and the yoke, wherein the coil is configured to output a signal corresponding to an amount of the displacement of the operation part, and the operation part is caused to move by an electric current flowing through the coil and the magnetic flux of the magnet.

2. The operation input device as claimed in claim 1, wherein the coil is positioned between the core and the yoke.

3. The operation input device as claimed in claim 2, wherein the coil, the core, and the yoke are disposed so that the magnetic flux generated in a gap between the core and the yoke is perpendicular to the axial direction.

4. The operation input device as claimed in claim 1, wherein the coil is placed over the core and the yoke in an unoperated state where the operation part is not operated.

5. The operation input device as claimed in claim 1, wherein the core and the yoke have respective parts positioned outside an end surface of the coil in the axial direction thereof in an unoperated state where the operation part is not operated.

6. The operation input device as claimed in claim 1, wherein a positional relationship of the yoke with the coil is changed by the displacement of the operation part.

7. The operation input device as claimed in claim 1, wherein the yoke has a cylindrical part formed therein, the cylindrical part having an inside diameter larger than an outside diameter of the coil.

8. The operation input device as claimed in claim 1, wherein the core includes a recess on an end surface thereof on a side facing toward the coil.

9. The operation input device as claimed in claim 1, wherein a flange formed on the yoke is fitted into a groove formed in a housing that accommodates the yoke.

10. The operation input device as claimed in claim 1, comprising:

an urging member configured to return the operation part to a position in an unoperated state where the operation part is not operated.

11. The operation input device as claimed in claim 1, wherein the operation part includes a tubular part fitted with an interior surface of a housing that accommodates the operation part.

12. The operation input device as claimed in claim 11, wherein an urging member configured to return the operation part to a position in an unoperated state where the operation part is not operated is fitted into the tubular part of the operation part.

13. The operation input device as claimed in claim 1, wherein the magnet has a cylindrical part formed therein, the cylindrical part having an outside diameter smaller than an inside diameter of the coil.

14. The operation input device as claimed in claim 13, wherein the core is fitted into the cylindrical part of the magnet.

15. The operation input device as claimed in claim 1, wherein the magnet has a cylindrical part formed therein, the cylindrical part having an inside diameter larger than an outside diameter of the coil.

16. The operation input device as claimed in claim 15, wherein the yoke has a cylindrical part formed therein, the cylindrical part having an inside diameter larger than the outside diameter of the coil and an outside diameter of the cylindrical part of the magnet.

17. An operation input detecting device, comprising:

an operation input device as set forth in claim 1;

a detection part configured to detect a change in inductance of the coil; and a control part configured to cause the operation part to move by causing an electric current to flow through the coil.

18. An operation input device, comprising:

a coil;

an operation part configured to be displaced in an axial direction of the coil by an action of an operation input;

a core and a yoke, wherein a positional relationship of the core and the yoke with the coil is changed by a displacement of the operation part; and a magnet placed between the core and the yoke, wherein the coil is configured to output a signal corresponding to an amount of the displacement of the operation part, and the operation part is caused to move by an electric current flowing through the coil and a magnetic flux of the magnet.

* * * * *